Jan. 24, 1928.
C. W. NEUSBAUM
1,657,272
CONTAINER FOR PRESERVING FOODS
Filed May 26, 1926
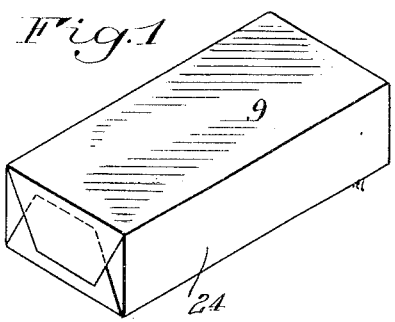
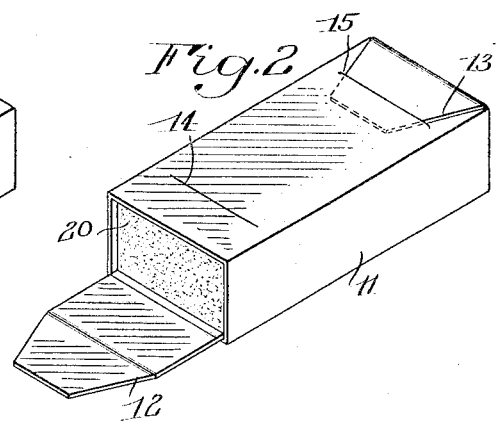
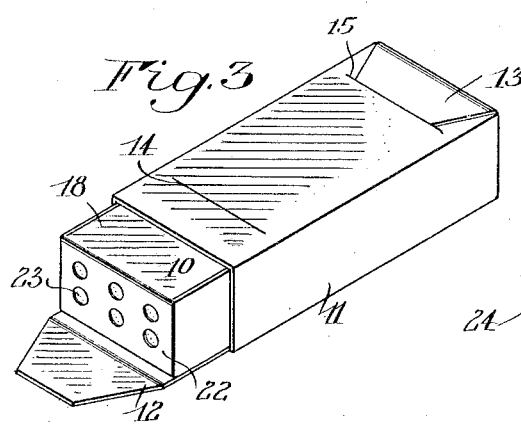
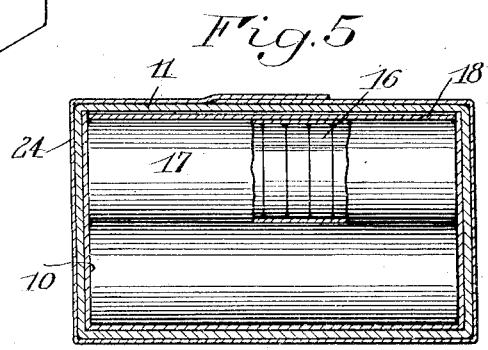
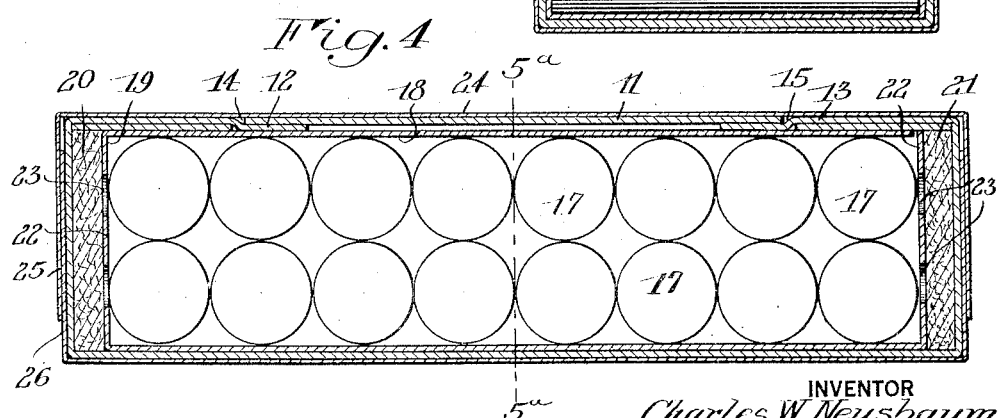
INVENTOR
Charles W. Neusbaum
BY
his ATTORNEYS Patented Jan. 24, 1928.

1,657,272

UNITED STATES PATENT OFFICE.

CHARLES W. NEUSBAUM, OF ROCHESTER, NEW YORK, ASSIGNOR TO BEECH-NUT PACKING COMPANY, OF ROCHESTER, NEW YORK, A CORPORATION OF NEW YORK.

CONTAINER FOR PRESERVING FOODS.

Application filed May 26, 1926. Serial No. 111,752.

The present invention relates to a container for preserving foods and has for its object to provide an improved box or container constructed to protect the contents thereof against moisture, whereby the food or food products are preserved or kept in a fresh condition.

A further object of the invention is to provide an improved box for preserving food or food products embodying telescoping casings constructed to permit of the advantageous use of material having hygroscopic properties for absorbing moisture from the contents of the box and to facilitate the packing, handling and displaying of the goods.

To these and other ends the invention resides in certain improvements and combination of parts, all as will be hereinafter more fully described, the novel features being pointed out in the claims at the end of the specification.

In the drawings:—

Fig. 1 is a perspective view of a complete box or container embodying the invention;

Fig. 2 is a perspective view of the container with the wrapper removed and with one flap withdrawn to indicate the manner of positioning the moisture absorbing pads at the ends of the package;

Fig. 3 is a perspective view somewhat similar to Fig. 2 with the inner casing shown partly withdrawn from the outer casing;

Fig. 4 is an enlarged sectional elevation taken longitudinally through the package shown in Fig. 1; and Fig. 5 is a transverse section taken on line 5ª—5ª of Fig. 4.

Similar reference numerals throughout the several views indicate the same parts.

The present invention has for its object to provide a box or container for preserving the flavor, crispness and freshness of articles of food packed therein, such as candy and the like by preventing the entrance of moisture to the same and by providing suitable means within the container for absorbing moisture from the dead atmosphere therein and also that given off from the candy or other food products packed within the container. For absorbing the moisture from the food products and the air space surrounding the same, any suitable material having hygroscopic properties may be used such as calcium or zinc chloride, which is supplied preferably by impregnating fibrous material with the same and placing it within the container in such a manner as to be directly exposed to the dead atmosphere surrounding the food products.

Referring to the drawings 9 represents the complete box and 10 and 11 represent inner and outer casings, respectively telescoped one within another, each being preferably constructed of heavy paper or cardboard. The outer casing carries at its ends adjustable closures or flaps 12 and 13 inserted through transversely extending slots 14 and 15 in one side of the casing. The inner casing 10 is filled with food or food products to be preserved or protected, which in the present instance comprises a confection in the form of fruit drops or the like indicated at 16 in Figure 5. These are preferably enclosed in paper coverings to form rolls 17 which are disposed within the casing 10 transversely thereof as shown in Figures 4 and 5. The inner casing 10, which is rectangular in shape, preferably comprises a complete enclosure for the confection, surrounding it on all sides and being insertable within and removable from the outer casing by a sliding movement through one end thereof when one of the end flaps is withdrawn as shown in Figures 2 and 3. This form of construction facilitates the handling and packing of the goods and the inner casing when withdrawn from the outer casing affords a container which can be used as a display carton for the confection by bending back the top 18 about the point 19 or upon itself at some point between its ends. Furthermore, the inner face of the casing 18 may contain suitable advertising matter, not shown, if it is desired to make use of the cover for this purpose.

A suitable packing preferably in the form of relatively thick pads 20 and 21 is disposed between the ends of the inner and outer casings as shown in Fig. 4. These pads are preferably of porous or fibrous material and are impregnated with any suitable material having hygroscopic properties such as calcium or zinc chloride and are adapted to readily absorb moisture from the interior of the casing 10 whereby the contents thereof are held in a dry atmosphere as long as the package remains sealed. Furthermore, any moisture contained in the food products at the time of packing will, when liberated, be absorbed by the impregnated pads so that the contents of the box will be held in a thoroughly dry atmosphere. Absorption of the moisture from the box is assured by perforating the end walls 22 of the inner casing as shown at 23 in Figures 3 and 4 which facilitates the passage of the moisture to the pads, allowing it to pass directly to the same without having to penetrate any intervening material. The perforations are preferably made relatively large and the number provided may be varied as desired.

The container formed by the inner and outer casings 10 and 11 is completely sealed and protected by a wrapper 24, the marginal portions of which are overlapped and secured by suitable adhesive material or in any manner desired. The wrapper 24 may be of wax tissue or any suitable paper or fabric treated to prevent the passage of moisture therethrough so that no moisture will be permitted to enter the box after it has been packed and sealed.

The various parts of the box or container shown may be quickly assembled, the box being particularly designed with this idea in view. In completing the package, the rolls 17 are placed in the casing 10 and the cover 18 closed over the same. Previous to positioning the inner casing within the outer casing, the pad 21 is placed in the rear end of the latter, after which said inner casing is inserted through the open end of the outer casing and moved to the position indicated in Fig. 4. The pad 20 is then placed against the outer end of the inner casing and the flap 12 closed.

The moisture-proof wrapper is then applied and sealed, thus completing the package. The container, therefore, includes three enclosures whereby the contents of the package are extremely well protected, the wrapper or outer enclosure being of a nature to prevent any moisture from entering the package and the hygroscopic material being adapted to directly absorb the moisture from the air confined within the inner casing through the openings formed in the sides or ends of the latter.

What I claim is:—

1. A food preserving container comprising inner and outer casings, pads disposed between the wall of said casings and impregnated with material having hygroscopic properties whereby to absorb moisture from the contents of the container and a sealed wrapper of moisture-proof material surrounding the container.

2. A food preserving container comprising inner and outer casings spaced apart at their ends, the inner casing forming a receptacle for food products and having its ends perforated and pads disposed between the spaced ends of the casings and impregnated with material having hygroscopic properties.

3. A food preserving container comprising inner and outer casings spaced apart at their ends, the inner casing forming a receptacle for food products and having its ends perforated, sheets of porous material disposed between the spaced ends of the casings and impregnated with material having hygroscopic properties, and a sealed wrapper of moistureproof material surrounding the container.

4. A food preserving container comprising a casing having an adjustable closure at one end, a food holding receptacle adapted to be inserted in and removed from said casing by a sliding movement through said end, said receptacle having perforations in its end walls and pads disposed between said perforated end walls and the ends of said casing, the pads being impregnated with hygroscopic material whereby to absorb moisture from the contents of the receptacle through said perforations.

5. A food preserving container comprising a casing having an adjustable closure at one end, a food holding receptacle adapted to be inserted within and removed from said casing through said end, said receptacle being shorter than the casing, pads of fibrous material disposed between the ends of the receptacle and the casing, said pads being impregnated with material having hygroscopic properties and a sealed wrapper of moistureproof material surrounding the container.

6. A food preserving container comprising inner and outer casings each provided with an end closure flap, perforations in the closure flap of the inner container, said inner container being shorter than said outer container whereby a space is provided within the end of the outer container and a pad impregnated with hygroscopic material inserted in said space.

CHARLES W. NEUSBAUM.